March 16, 1965 R. A. ZUCK 3,173,533

MAGNETIC CODE READING AND PRINTING MEANS

Filed April 19, 1961 2 Sheets-Sheet 1

INVENTOR.
RAY A. ZUCK

BY Jacob Trachtman

ATTORNEY

INVENTOR.
RAY A. ZUCK
BY Jacob Trachtman
ATTORNEY

United States Patent Office 3,173,533

Patented Mar. 16, 1965

3,173,533
MAGNETIC CODE READING AND PRINTING MEANS

Ray A. Zuck, Lafayette Hill, Pa., assignor to General Atronics Corporation, Bala-Cynwyd, Pa., a corporation of Pennsylvania Filed Apr. 19, 1961, Ser. No. 104,132
9 Claims. (Cl. 198—38)

Figure 1:
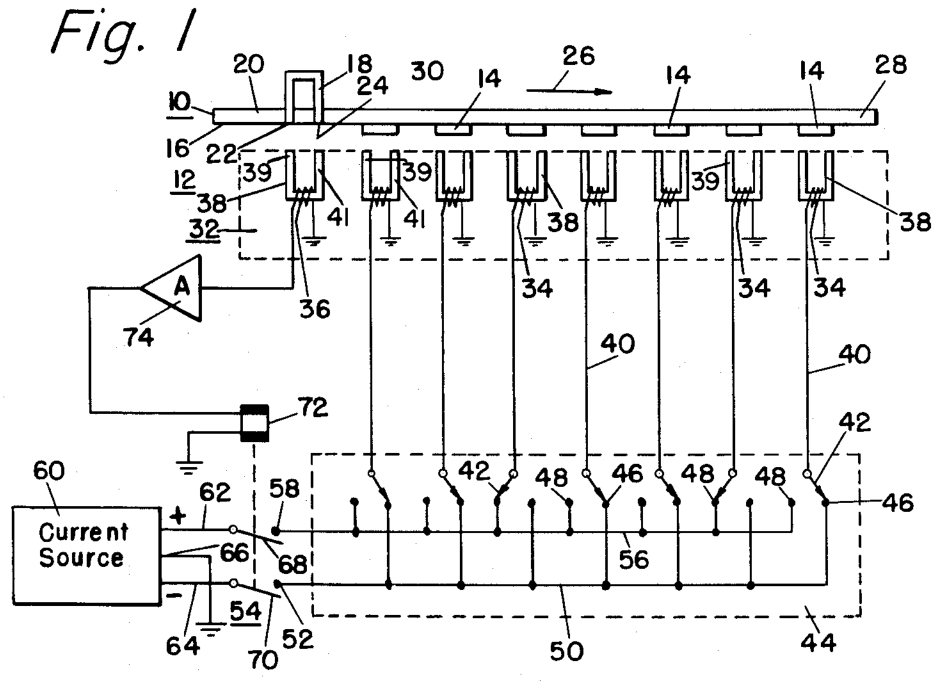

The invention relates to magnetic code reading and printing means, and more particularly to a magnetic code reading and printing means for automatic routing systems.

Heretofore, magnetic code reading and printing means for routing systems have not effectively been utilized to provide a highly efficient and effective means for routing various articles to predetermined locations. The prior devices have been highly complex, have not been fully automatic in the coding technics utilized, and have not allowed the continuous movement of articles during the coding and reading processes.

It is, therefore, the principal object of the invention to provide a new and improved magnetic code reading and printing means particularly adapted for use in an automatic routing system.

Another object of the invention is to provide a new and improved magnetic code reading and printing means providing dynamic reading and printing operations during the movement of articles which are to be coded or have a code associated therewith which is to be read.

Another object of the invention is to provide a new and improved magnetic code reading and printing means utilizing an index magnet for allowing concurrent code reading of each of the code elements, or during a coding operation allows concurrent printing of each of the code elements in the appropriate locations.

Another object of the invention is to provide a new and improved magnetic code reading and printing means for a routing system which prints a destination code on a code bar of an article conveying means and provides code reading stations for deflecting or routing articles being conveyed in accordance with the coding of the code bar, and such articles being deflected only when routing channels for receiving the articles are in condition for receiving same.

Another object of the invention is to provide a new and improved magnetic code reading and printing means for a routing system utilizing magnetic coding which may be periodically changed and effectively erased during the printing operation.

Another object of the invention is to provide a new and improved magnetic code reading and printing means which is highly efficient in operation, is relatively inexpensive to manufacture and maintain in operation, and may readily be adapted for meeting various design requirements.

The above objects, as well as many others, are achieved by providing magnetic code reading and printing means for an automatic routing system providing a code bar which may be secured with an article supporting and conveying means which moves along a conveying path. A code bar receives magnetic information and has a permanent magnet providing a magnetic field fixed at a predetermined location along the code bar and one or more magnetizable locations or patches positioned along the code bar with respect to the magnetic field of the permanent magnet for respectively recording magnetic signals to provide coded information. A code printing station is provided with a code printing means which is positioned along said conveying path so that said code bar moves proximate thereto along its path. The printing means includes a signal pick-up coil for detecting the location of the magnetic field of the permanent magnet of the code bar as it moves proximate thereto and the plurality of writing coils for recording signals respectively at said magnetizable locations of the code bar to produce respective magnetic fields with predetermined polarizations at said locations. The printing means prints coded information upon the magnetizable locations in response to the detection of the magnetic field of said permanent magnet by the pick-up coil of the printing means.

The positions of the writing coils with respect to the pick-up coil correspond respectively to the positions of the magnetizable locations with respect to the magnetic field of said permanent magnet of the code bar, so that said writing coils are proximate to their respective magnetizable locations when the pick-up coil detects the field of said permanent magnet. The permanent magnet of the code bar provides a magnetic field intensity which exceeds the magnetic field intensity provided by any one of said magnetizable locations.

The code printing means includes switching means for selecting respective directions of current flow through the writing coils to control the polarities of the fields produced at said magnetizable locations of said code bar by the printing means. The writing coils are aligned for producing respective magnetic fields in one of first and second predetermined directions, the field produced in said second direction being opposite to said first direction and results from the reversal of current flow to any one of said writing coils producing a magnetic field in said first direction. The magnetic field in the first direction of the writing coils is in the direction along the code bar and in the same direction as the direction of the polarity of the magnetic field of the permanent magnet of the code bar.

A code reading means is provided and positioned along the path of said conveying means for having the code bar move proximate thereto and includes the signal pick-up coil for detecting the presence and location of the magnetic field of said permanent magnet of said code bar and one or more signal reading coils for sensing signals at respective predetermined magnetizable locations of said code bar for deriving coded routing information from said code bar upon the detection of the field of said permanent magnet by said pick-up coil. The reading coils are aligned to provide first and second signals respectively responsive to sensing magnetic fields of said magnetizable locations in said first and second directions.

The reading means includes gating means delivering an output signal upon the concurrence of predetermined signals from the reading coils during the detection of the field of said permanent magnet of said code bar by the pick-up coil of the reading means. Control means upon the delivery of an output signal from the gating means may route an article being conveyed to a predetermined location or chute. If such chute or other means are not in condition for receiving such conveyed matter, the control means may be inhibited causing the article to be rerouted or recirculated until the time when the article may be delivered to its predetermined location.

Figure 2:
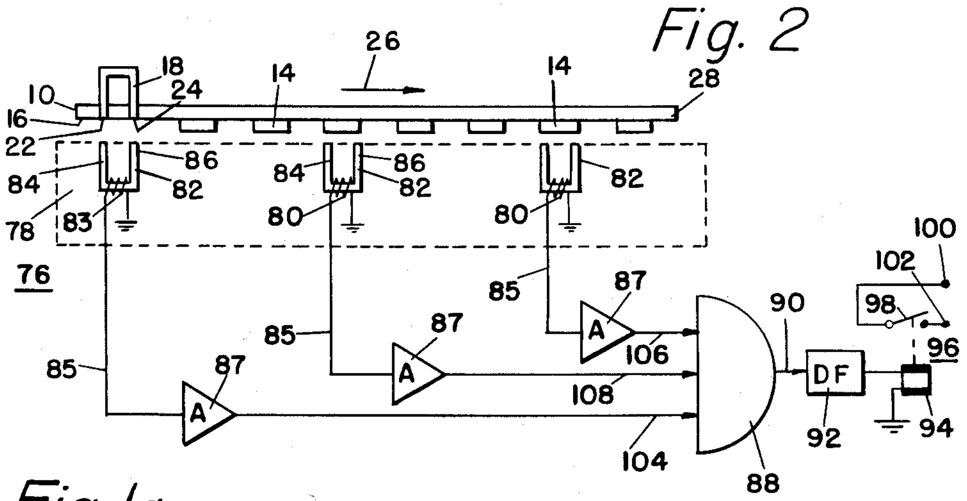
Figure 1A:
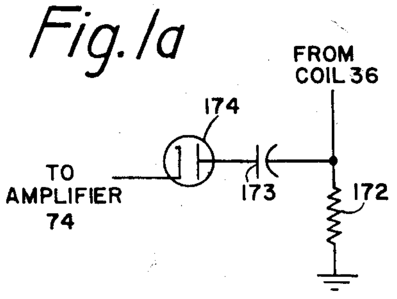
Figures 3, 4:
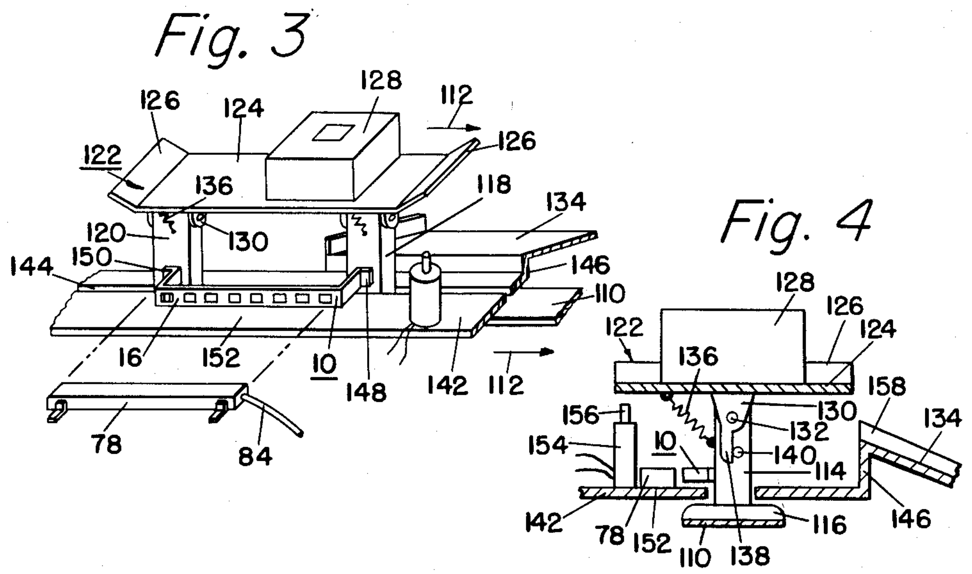
Figure 5:
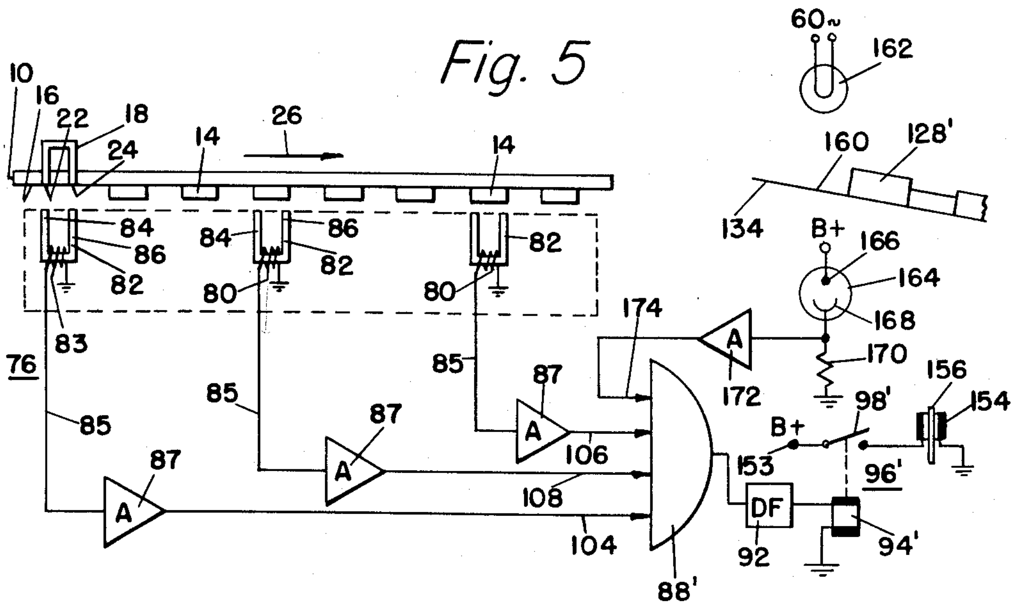

The foregoing and other objects of the invention will be more apparent as the following detailed description of the invention is read in conjunction with the drawings, in which:

FIGURE 1 is a schematic diagram illustrating a code printing means embodying the invention, FIGURE 1(*a*) shows those portions of a modified form of the embodiment of FIGURE 1 which differ from those illustrated in FIGURE 1, FIGURE 2 is a schematic diagram illustrating a code reading means embodying the invention, FIGURE 3 is a perspective view of an article conveying means of a routing system including a code bar, and code reading means, FIGURE 4 is a side elevational view partly in section of the conveying means of FIGURE 3, FIGURE 5 is a schematic diagram of a modified code reading means including conveyor controlling means.

Like reference numerals designate like parts throughout the several views.

FIGURE 1 is a schematic diagram of a code bar 10 and a code printing means 12. The code bar 10 is provided with a plurality of magnetizable locations or patches 14 positioned along its front side 16 in spaced relationship to each other and to a permanent magnet 18 permanently fixed at the end 20 of the code bar 10. The pole ends 22, 24 of the permanent magnet 18 extend through the code bar 10 and provide a magnetic field at the side 16 of the code bar 10. With this arrangement, it is noted that the direction of the magnetic flux and polarization of the magnetic field provided by the magnet 18 of the code bar 10. Each of the printing and pick-up direction arrow 26.

In the arrangement of the code bar 10 illustrated, the magnetizable locations or patches 14 begin at the end 28 of the code bar 10 and are spaced along the side 16 of the code bar, with the permanent magnet 18 positioned on the code bar 10 after the last magnetizable patch 30. The locations or patches 14 may be magnetized to provide a magnetic field with polarizations in a direction along the code bar 10. In this connection, the polarization may be in the direction of the arrow 26 or in the opposite direction for providing a binary coding respectively designating the numbers "1" and "0."

The printing means 12 comprises a printing head 32 including a plurality of writing or printing coils 34 corresponding to the magnetizable locations 14 of the code bar 10. The printing head 32 also includes a pick-up coil 36 positioned to correspond with the permanent magnet 18 of the code bar 10. Each of the printing and pick-up coils 34, 36 is wound about a core 38 which is a good conductor of magnetic flux and provides pole ends 40, 42. The cores 38 of said printing and pick-up coils 34, 36 are spaced with respect to each other, so that when the pole ends 39, 41 of the core 38 of the pick-up coil 36 are positioned proximate to the ends 22, 24 of the permanent magnet 18, the pole ends 39, 41 of the printing coils 34 are positioned proximate to respective magnetizable patches 30 of the code bar 10.

Each of the writing or printing coils 34 has one of its leads returned to ground potential while its other lead 40 connects to a respective switch arm 42 of a switching means 44. The switch arm 42 may selectively engage its respective contact 46 or its contact 48. The contacts 46 of the switch arms 42 are connected to a bus 50 joined to the contact 52 of a printing relay switch 54, while the contacts 48 are joined to a bus 56 which is connected with the terminal 58 of the relay switch 54.

A current source 60 is provided with a positive potential output lead 62, a negative potential output lead 64, and a lead 66 connected to ground potential. The output lead 62 is connected with the arm 68 while the negative output lead 64 is joined with the arm 70 of the relay switch 54. The arms 68 and 70 engage respectively the contacts 58 and 52 when activated by the energization of the relay coil 72. When the relay coil 72 is deactivated, the arms 68, 70 are in their disengaged positions out of contact with their respective terminals 58, 52.

In order to print a predetermined code upon the magnetizable patches 14 of the code bar 10, the switching means 44 has its switch arms 42 each positioned to respectively engage its selected contact 46 or 48. If the arm 42 engages the contact 46, the current flow through the printing coil 34 will be in a direction to produce a "0" code signal upon its respective code patch 14 while if its switch arm 42 engages the contact 48, the direction of current flow will be reversed and will produce a "1" code signal upon the respective code patch 14. Thus, for example, in FIGURE 1 the switching means 44 has its arms 42 positioned for producing a code "0010010" reading from right to left along the magnetizable patches 14 of the code bar 10.

The printing means 12, however, is not energized to print the code unless and until the printing coils 34 and their cores 38 are proximally positioned to their corresponding magnetizable patches 14 of the code bar 10. In the arrangement illustrated in FIGURE 1, the code bar 10 moves relative to the printing head 32 in the direction of the arrow 26 and the pick-up coil 36 derives a signal of predetermined amplitude above a given threshold value only when the permanent magnet 18 moves proximate to the core 38 of the pick-up coil 36. This is because the field strengths of the magnetizable locations 14 are less intense than the field strength produced by the permanent magnet 18 and are below said threshold value. When a signal from the pick-up coil 36 above the threshold value is delivered to a signal amplifier 74, the amplifier 74 provides an output signal which energizes the coil 72 of the relay switch 54.

Energization of the relay coil 72 activates the relay 54 and delivers current from the current source 60 to the buses 50, 56 and through the switching means 44 for supplying respective current in predetermined directions through the printing coils 34. The current through each of the coils 34 produces a magnetic flux which is in a predetermined direction along the path provided by its core 38 to the core ends 39, 41 which are positioned proximate to respective magnetizable patches 14 of the code bar 10. The magnetic flux flows through the magnetizable locations or patches 14 producing polarized magnetizations of said locations 14.

The relay switch 54 is closed for a period of time sufficient to produce the required magnetization of the patches 14 of the code bar 10, after which it resumes its open position de-energizing the printing coils 34. The printing operation thus may take place during a short interval of time during which the code bar 10 may be in motion in the direction of the arrow 26 past the printing head 32 and without the interruption of such motion providing a dynamic printing operation of high efficiency.

The permanent magnet 18 and the relative positioning of the magnetizable locations 14 of the code bar 10, and the pick-up coil 36 and the relative positions of the printing coils 34 of the printing head 32, allow the detection of the presence and alignment of the code bar 10, so that a printing operation may take place when the magnetizable patches 14 and their respective printing heads are in a proximate position and in alignment. Since the pick-up coil 36 is not responsive to the lower intensity of the magnetic field at the patches 14, a printing action does not take place until a higher intensity field of the permanent magnet 18 is detected, thereby preventing the printing of improper coding information which might otherwise result in the absence of such an indexing means.

It is noted that since each of the printing coils 34 magnetizes a corresponding code patch 14 in a predetermined polarization, coded information which may be present due to previous printing operations, is automatically erased by the magnetizing action of the printing coils 34, thereby avoiding the necessity of a prior erasing operation of the code bar 10 when a new code is to be printed.

It is also noted that the magnetic coding means has the advantage of not requiring contact with the code bar 10 for the purpose of printing coded information thereon, as well as allowing the relative motion between the code bar 10 and the printing head 32 during a printing operation.

FIGURE 2 is a schematic diagram illustrating the code bar 10 and information reading means 76. The information reading means 76 includes a reading head 78 comprising a plurality of reading coils 80 and a signal pick-up coil 83, each having a core 82 with pole ends 84, 86. The cores 82 provide respective flow-paths for the magnetic flux produced by the magnetic fields present at the code patches 14 and permanent magnet 18 of the code bar 10. Thus, when the code patches 14 move proximate to the cores 82, magnetic flux provided by the magnetic fields of the code patches 14 and permanent magnet 18 flowing through the cores 82 produce a current flow or voltage signal in their respective reading coils 80 and signal pick-up coil 83. The signal derived has a voltage polarity which depends upon the polarity of the magnetic field inducing the signal.

One lead of each of the reading coils 80 and signal pick-up coil 83 is returned to ground potential, while the other lead 85 delivers an input signal to respective amplifiers 87. The amplifiers 87 deliver respective input signals to an "and" gate 88 which delivers a signal to its output line 90 upon the concurrence of input signals from the several amplifiers 86. The output signal from the gate 88 is delivered over line 90 to a delay flop circuit 92 which, after a predetermined delay, energizes the activating coil 94 of a control relay 96. Upon energization of the coil 94, the switch arm 98 of the control relay 96 is closed completing a circuit between the terminal 100, 102 of an output circuit.

In the embodiment of the information reading or detecting means 76 shown in FIGURE 2, the reading coils 80 and their cores 82 are positioned in spaced relationship to lie proximate to predetermined magnetizable locations or patches 14 when the signal pick-up coil 83 and its core 82 are opposite the pole ends 22, 24 of the code bar 10. Thus, in the case where the code bar 10 is moving in the direction of the arrow 26 relative to the information reading head 78, the pick-up coil 83 will deliver a signal of the proper amplitude and polarization only when it is positioned proximate to the permanent magnet 18 of the code bar 10. Only at this time does the amplifier 87 which receives a signal from the signal pick-up coil 83 deliver an output signal to the input 104 of the gate 88. If, at this time, the reading coils 80 detect signals of the required polarities such as "1" code signals at their respective proximally positioned code patches 14, their respective amplifiers 87 will also concurrently deliver output signals to the inputs 106, 108 of the gate 88. This will result in the delivering of an output signal on the output lead 90 of the gate 88.

The reading means 76 with reading coils 80 and cores 82 positioned as illustrated in FIGURE 2 will provide an output signal on line 90 when the code bar 10 has the code 0010010 imprinted thereon by the code printing means 12 of FIGURE 1 with the switch arms 42 of its switch means 44 in the positions illustrated. With such a code, the polarization present on the code patches 14 proximate the reading coils 80 and their cores 82 represent the digital numeral "1." This results in the delivery of an output signal by their respective amplifiers 87 to the gate 88 with the concurrence of a signal to its input 104 from the pick-up coil 83. If one of the proximate code patches 14 had a polarization representing the binary value "0," input signals would not be concurrently presented to the input lines 104, 106 and 108 of gate 88 and an output signal will not be delivered by the gate 88.

If the reading head 78 is to read a different code, that is, one with the binary value "1" imprinted at different locations or code patches 14 along the code bar 10, then the reading coils 80 and cores 82 are appropriately spaced from the pick-up coil 83 and core 82 of the reading head 78 to detect the presence of such a code.

Although the reading head 78 of FIGURE 2 discloses means for reading only one code representation, a more general reading head 78 may be provided with reading coils 80 and cores 82 positioned for each of the code patches 14, and which may be appropriately switched to read specified code representations, or may have their output signals delivered to a diode matrix, such as those very well known in the art, for producing output signals on respective lines indicating the detected code representation. The reading means 76 illustrated in FIGURE 2, however, is a highly simplified structure, and is efficient for requiring a minimum number of components for detecting the presence of a selected code representation.

Upon the detection of the required code representation upon the code bar 10 by the reading means 76, a signal from the gate 88 is delivered to the delay flop 92 for energizing the relay coil 94 and closing the circuit between the terminals 100, 102 for carrying out such control operations or other operations which may be desired at the time.

FIGURES 3 and 4 illustrate the application of the code printing and reading means to an article or material conveying system. A conveyor belt 110 moves in the direction indicated by the arrow 112. An article supporting means 114 has its base 116 secured with the conveyor belt 110 for supporting and moving same along the conveying path. The supporting means 114 includes vertical front and rear posts 118, 120 secured at their bottom ends with the base 116 and hingedly supporting an article supporting tray 122 at their top ends. The tray 122 has a top platform 124 and upturned flanges 126 at each end for receiving and supporting an article 128 to be conveyed. The under side of the platform 124 is provided with hinge means 130 which engage hinge pins 132 for allowing the tray 122 to pivot thereabout and slidably deliver a conveyed article 128 from the tray 122 to a proximally positioned chute 134. The tray 122 is biased to its horizontal position by a pair of coil springs 136. The springs 136 urge an extending portion 138 of the hinge 130 against a stop pin 140 for maintaining the tray 122 in a horizontal position.

The conveyor belt 110 is provided with enclosing horizontal shelf 142 above it having a slit 144 through which the posts 118, 120 of the supporting means 114 extend. The chute 134 may be appropriately positioned along the conveyor belt 110 and supported at the rear edge 146 of the shelf 142.

The code bar 10 is secured to the posts 118, 120 of the article supporting means 114 at its ends 148, 150 with its vertical face 16 extending longitudinally in the direction of motion 112 of the conveyor belt 110 and the article supporting means 114. A code detecting or reading station 152 is provided along the conveyor path by having the reading head 78 of an information reading means 76 supported upon the shelf 142 so that the surface 116 of the code bar 10 passes proximate to its core ends 84, 86 of the cores 82 and their reading coils 80 and signal pick-up coil 83 of the head 78 as illustrated in FIGURE 4. A plurality of such code reading stations may be provided along the conveyor path.

In operation, as an article supporting means 114 passes a reading station such as that at 152 of FIGURES 3 and 4, the reading head 78 senses the coded information on the code bar 10 connected with the means 114. If a particular code representation is present, the reading means 76, as already noted, delivers an output signal which is received by the delay flop 92. Referring to FIGURE 5 which is a modified form of the information reading means and control circuit in FIGURE 2, the delay flop 92 after a predetermined delay energizes the actuating coil 94′ of the relay 96′ resulting in the closing of the armature 98′. In this case, the closing of the armature 98′ results in delivery of a positive voltage from the terminal 153 to a dump solenoid 154 which activates its armature 156. As seen from FIGURE 4, an upward motion of the armature 156 of the dump solenoid 154 upon its activation, as the means 114 passes the station at 152, applies a torque force to the tray 122 of the article supporting means 114 resulting in the turning of the tray in the clockwise direction. As the tray 122 tilts, it passes proximate to end 158 of the chute 134, and the article 128 slides from the tray 122 onto and down the chute 134. With the removal of the article 128 from the tray 122, the tray which is biased towards its horizontal position by the coil springs 136 moves in the counter-clockwise direction until it again assumes its horizontal condition. During the dumping operation, the tray 122 may continue its motion while discharging the article 128. Thus, the article conveying means 114 is not interrupted in its motion along the conveying path by the reading of the code bar 10 or the discharge of the article 128.

In the event that the code representation printed on the code bar 10 does not correspond to the predetermined code representation which is sensed by the reading head 78, the solenoid 154 is not actuated and the supporting means 114 continues along the conveying path without discharging the article 128 which it may be supporting. Upon reaching the appropriate location where the article 128 is to be delivered, the reading head 78 detects the required code representation associated with the article supporting means 114 for dumping the article 128.

As a safety precaution, the control circuit for discharging the tray 122 may also be provided with a means for detecting the condition of the chute 134 to determine whether it can accept an article 128. For this purpose the end region 160 of the chute 134 may be provided with a beam of light passing across the path transversed by articles 128, the beam of light being produced by an incandescent bulb 162 energized by alternating current. In the absence of an article 128′ on the chute 134 blocking the beam of light from the bulb 162, the beam is received by a photoelectric cell 164. The cell 164 has its anode 166 connected to a positive potential and its cathode 168 returned to ground potential through a cathode resistor 170. The cathode 168 is joined to the input of a signal amplifier 172 which delivers an output signal to the input line 174 of the signal gate 88′. When the beam of light from the bulb 162 is received by the photoelectric cell 164, it conducts current resulting in a positive signal being delivered to the amplifier 172 which provides a gating signal to the input lead 174 of the gate 88′.

In the case of overloading, when the articles 128 are not being removed from the chute 134 at a sufficient rate and an article 128′ interrupts the beam of light from the bulb 162, the absence of light intensity upon the photoelectric cell 164 results in its becoming non-conductive. With the cell 164 non-conducting, the positive signal to the amplifier 172 approaches ground potential, so that a gating signal is not delivered to the input 174 of the gate 88′. In the absence of such a gating signal to the input 174 of the gate 88′, the gate 88′ is inhibited from delivering an output signal. This halts the delivery of additional articles 128 to the chute 134 until the chute is in condition to receive same. This also prevents overloading of the chute and damage which may otherwise result from such a condition. In the event that the article 128 is not dumped, it continues in position on the tray 122 and will be dumped on the next circuit when it passes the appropriate chute if the chute is in any condition to receive same or may be disposed of in another such manner.

In order to complete the conveying system described in connection with FIGURES 3 and 4, the printing head 32 of the printing means 12 of FIGURE 1 may be positioned at a predetermined location along the path of the conveyor belt 110 so that the code bars 10 of a plurality of the article supporting means 114 move proximate thereto. The switching means 44 of the code printing means 12 may have their armatures 42 positioned for particular destination code representation required for an article 128 which is to be placed upon the tray 122 of a supporting means 114 as it passes a predetermined location. As the code bar 110 passes the printing head 32 of the means 12, the required selected code for the particular article 128 is automatically printed upon the magnetizable locations or patches 14 of the code bar 10 secured with the supporting means 114 as the article is received by the means 114. When the supporting means 114 approaches the location where the article 128 is to be discharged, the reading head 78 at an appropriate station 152 will read the code representation and actuate the solenoid 154 resulting in the discharge of the article 128 when the chute or means which is to receive it is in condition to accept the article 128. In the event that the article 128 is not accepted, it continues upon the supporting means 114 until it is appropriately discharged at the required location or station.

The printing means 12 may also be provided with a photoelectric cell 164 and light source 162 for sensing the presence of an article 128 upon the platform 124 of the article supporting means 118 for inhibiting the automatic placing of an article 128 on the tray 122 and imprinting the required destination on the code bar 10 when the platform 124 of the tray 122 is supporting a previously received article 128.

The conveyor belt 110 may support and move a plurality of article conveying means 114 for receiving and discharging articles 128 at appropriate locations. It is noted in this connection that when a new article 128 is to be placed on an article supporting means 114 which had previously carried an article to a different location, the printing of a new code upon the code bar 10 automatically removes the old code without requiring a previous erasing operation.

Either the magnetic code printing means, or the magnetic code reading means described above, or both, may be modified further by the inclusion of circuits which differentiate the output signal from the respective permanent magnet responsive pick-up coil and detect only that polarity of differentiated signal which corresponds to a reversal in the direction of current flow in said coil. These added circuits may take any one of a variety of known forms. For example, as shown in FIGURE 1(*a*), the code printing means of FIGURE 1 may be modified as follows. The differentiation of the signal from a pick-up coil such as coil 36 of FIGURE 1 may be accomplished by a simple resistance-capacitance (R-C) network, 172, 173 connected in its differentiating configuration, while the detection of the differentiated signal may be accomplished by a simple diode detector 174 suitably poled with respect to the output of the R-C network. The output of the detector is then used via an amplifier such as amplifier 74 of FIGURE 1 to control the timing of the code printing operation in the manner described previously with reference to FIGURE 1. As pointed out above, this output corresponds to a reversal in the direction of the current induced in the pick-up coil by the passage of the permanent magnet. It can be shown that the time of occurrence of this reversal is independent of the speed of movement of the magnet. Accordingly, this modified embodiment is insensitive to variations in conveyor speed. A similar modification may be made in the code reading means such as that illustrated in FIGURE 2, with corresponding results.

Although the magnetic code reading and printing means has been illustrated in connection with an automatic routing system, it is apparent that the code printing and reading means may be utilized in connection with other apparatus and systems for providing increased efficiency and reliability of operation.

It will be obvious to those skilled in the art that the invention may find wide application with appropriate modification to meet the individual design circumstances, but without substantial departure from the essence of the invention.

What is claimed is:

1. Magnetic coding means comprising means for receiving magnetic information having a permanent magnet providing a magnetic field at a predetermined location and a plurality of respective magnetizable locations positioned with respect to the magnetic field of said permanent magnet for recording respective magnetic signals to provide coded information, the magnetic field intensity provided by said permanent magnet exceeding the magnetic field intensity provided by any one of said magnetizable locations.

2. The means of claim 1 characterized in that said permanent magnet and magnetizable areas are arranged in a straight line and in that said permanent magnet and each of said magnetizable areas are magnetized in a direction parallel to said line.

3. A magnetic code identifying system comprising: code bearing means having a permanent magnet and a plurality of magnetizable areas in predetermined spatial relation to said permanent magnet; an induction coil responsive to the passage of said permanent magnet in proximity to said coil to produce an electrical current, said current representing variations in magnetic field intensity experienced by said coil during said passage and said current undergoing a reversal in polarity upon reversal in the direction of change of said intensity during said passage; means for detecting said reversal in the polarity of said current; and means responsive to said reversal detection to detect the polarity of magnetization in at least some of said areas bearing a predetermined spatial relation to said permanent magnet.

4. The system of claim 3 further comprising means for producing said passage of said permanent magnet in proximity to said coil.

5. The system of claim 3 further characterized in that said reversal detecting means comprises means for differentiating said electrical current.

6. The system of claim 3 characterized in that all of said areas are magnetized.

7. A magnetic code identifying system comprising: code bearing means having a permanent magnet and a plurality of magnetizable areas in predetermined spatial relation to said permanent magnet; an induction coil responsive to the passage of said permanent magnet in proximity to said coil to produce an electrical current, said current representing variations in magnetic field intensity experienced by said coil during said passage and said current undergoing a reversal in polarity upon reversal in the direction of change of said intensity during said passage; means for detecting said reversal in the polarity of said current; and means responsive to said reversal detection to impart magnetization to at least some of said magnetizable areas.

8. The system of claim 7 further characterized in that said reversal detecting means comprises means for differentiating said electrical current.

9. The system of claim 7 further characterized in that said last-named means imparts magnetization to all of said areas.

References Cited in the file of this patent

UNITED STATES PATENTS

| | | |
|---|---|---|
| 1,968,547 | Yost | July31, 1934 |
| 2,784,851 | Bretschneider | Mar. 12, 1957 |
| 2,866,151 | Applin et al. | Dec. 23, 1958 |
| 2,877,718 | Mittag | Mar. 17, 1959 |
| 2,900,146 | Hafner et al. | Aug. 18, 1959 |
| 2,974,277 | Wales | Mar. 7, 1961 |
| 3,075,653 | Wales et al. | Jan. 29, 1963 |

UNITED STATES PATENT OFFICE
CERTIFICATE OF CORRECTION

Patent No. 3,173,533 March 16, 1965

Ray A. Zuck

It is hereby certified that error appears in the above numbered patent requiring correction and that the said Letters Patent should read as corrected below.

Column 3, line 21, strike out "of the code bar 10. Each of the printing and pick-up" and insert -- is in a direction along the code bar 10 similar to the --.

Signed and sealed this 18th day of January 1966.

(SEAL)
Attest:

ERNEST W. SWIDER
Attesting Officer

EDWARD J. BRENNER
Commissioner of Patents